United States Patent [19]

Von Bergen et al.

[11] Patent Number: 5,137,116
[45] Date of Patent: Aug. 11, 1992

[54] SEALING DEVICE FOR A ROTATING SHAFT OF A SHIP PROPELLER SHAFT

[75] Inventors: Ernst-Peter Von Bergen, Ahlefeld; Günter Pietsch, Hamburg, both of Fed. Rep. of Germany

[73] Assignee: Blohm + Voss AG, Hamburg, Fed. Rep. of Germany

[21] Appl. No.: 707,348

[22] Filed: May 30, 1991

[30] Foreign Application Priority Data

May 30, 1990 [DE] Fed. Rep. of Germany ....... 4017335

[51] Int. Cl.$^5$ .............................................. F01M 5/00
[52] U.S. Cl. .................. 184/6.22; 184/104.1; 277/3; 277/34
[58] Field of Search .................. 184/6.22, 6.4, 104.1, 184/104.2; 277/3, 34, 34.3, 58, 59, 63

[56] References Cited

U.S. PATENT DOCUMENTS

| | | | |
|---|---|---|---|
| 2,512,361 | 6/1950 | Mercier | 184/6.22 |
| 2,584,252 | 2/1952 | Bourgeois | 184/104.1 |
| 3,632,120 | 1/1972 | Brandt | 277/83 |
| 3,689,082 | 9/1972 | Satterthwaite | 277/34 |
| 3,847,453 | 11/1974 | Herbert | 277/34.3 |
| 3,985,365 | 10/1976 | Catanzaro | 277/34 |
| 4,041,718 | 8/1977 | Stone | 277/34 |
| 4,436,313 | 3/1984 | Tamama et al. | 277/80 |
| 4,448,425 | 5/1984 | Von Bergen | 277/34 |

FOREIGN PATENT DOCUMENTS

| | | |
|---|---|---|
| 2301532 | 7/1973 | Fed. Rep. of Germany . |
| 3122406 | 12/1982 | Fed. Rep. of Germany . |
| 3143866 | 5/1983 | Fed. Rep. of Germany . |

Primary Examiner—Allen M. Ostrager
Assistant Examiner—Alan B. Cariaso
Attorney, Agent, or Firm—Nils H. Ljungman & Associates

[57] ABSTRACT

A lubrication system for a rotatable propeller shaft of a ship. The system includes a seal for sealing lubricant adjacent the shaft and at least one annular chamber defining a hose-shaped inflatable body. A ring line supplies a fluid heat transfer medium, such as air, to the at least one annular chamber. The heat transfer medium is heated by a heat source. The heat transfer medium may also act as a pressure medium to inflate the inflatable body. The heat transfer medium can be circulated so that when the propeller shaft is stationary in an extremely cold liquid medium, such as icy sea water, the inflatable body is inflated by the heat transfer medium so that the inflatable body expands to within a major portion of the at least one annular chamber while, simultaneously, heating lubricant in the remaining portion of the annular chamber. Such heating causes the lubricant viscosity to approximately equal the viscosity of the lubricant when the propeller shaft rotates and the lubricant is not heated. During rotation of the propeller shaft, the inflatable body is deflated out of the annular chamber.

11 Claims, 5 Drawing Sheets

SEALING DEVICE FOR A ROTATING SHAFT OF A SHIP PROPELLER SHAFT

BACKGROUND OF THE INVENTION

1. Field of the Invention

The present invention relates to a sealing apparatus and lubrication system for rotating shafts and, more particularly, to a stern tube seal and lubrication system for a propeller shaft of a ship.

2. Background Information

Systems of this type, which are disclosed in German Laid Open Patent Application No. 3122406, work satisfactorily if the liquid medium, such as lubricating oil, against which a seal is to be made does not have an extremely low temperature when the shaft is restarted after a rather long shutdown. That is because if the temperature is not extremely low, then the viscosity of the lubricating oil does not increase as much during shutdown of the shaft as when the temperature is extremely low. However, when the shaft resumes operation under extremely low temperature conditions, the seal gaskets, which generally consist of rubber or elastic material, may become damaged and their sealing function or capability may, thus, be reduced.

The same, or similar, conditions exist if water is used as a lubricant, because no ice is formed on the gaskets unless extremely low temperatures are encountered. However, if conditions prevail in which the water is severely supercooled, as is the case in icy waters and oceans, the sealing devices no longer work satisfactorily because the water in the annular chamber of the seal freezes. Also, under such supercooled conditions, if lubricating oil is used, the lubricating oil becomes highly viscous in the relatively small annular seal chambers. In both cases, the danger then exists that the gaskets will be damaged, particularly on their sealing edges, and thus their sealing function may be adversely affected or even destroyed.

OBJECT OF THE INVENTION

One object of the present invention is to overcome the deficiencies of these sealing devices of the prior art and to provide a refined lubrication system and sealing device so that with relatively little effort and expense, the danger of damage to the gaskets during startup of the shaft, after a long period of shutdown in a liquid medium with an extremely low temperature, can be avoided. This object is achieved in accordance with the present invention.

SUMMARY OF THE INVENTION

In accordance with the present invention, an inflatable, hose-shaped body is provided which is displaceable such that heat exchange surfaces of the body are positioned into the immediate vicinity of the gaskets when the shaft is stationary. For lubrication systems with sealing devices in which the circulation of the lubricant is not driven by means of an externally powered pump apparatus, but rather wherein lubrication circulation takes place exclusively by the hydrodynamic pumping of the gaskets in interaction with the shaft, such displaceable heat exchange surfaces cause a heating of the lubricant in the vicinity if the gaskets. This type of sealing device is one wherein the circulation of the lubricant is stopped when the shaft is stationary.

The prior art (e.g. German Laid Open Patent Application No. 2301532 and German Laid Open Patent Application No. 3143866), discloses the use of an inflatable hose-like body into which a pressure medium can be introduced. However, the device disclosed in such prior art documents, the inflatable body does not act as a transmitter of heat to the lubricant. Rather, the inflatable body acts as a damping agent for pressure fluctuations and/or as a means of application of a mechanical seal that interacts with the shaft.

In accordance with one advantageous embodiment of the present invention, the inflatable body is embedded in a lateral annular groove of an annular chamber so that, when the body is deflated, the body is retracted into the annular groove. Moreover, when the body is inflated, the body projects into the annular chamber. In this manner, a favorable positioning of the heat exchange surfaces is achieved during the heating phase, while the annular chamber is completely opened during the idle phase.

In addition to guaranteeing protection against damage to the seals due to supercooling when the shaft is stopped, the present invention provides a simple means to achieve an improvement in operating safety during normal operation of the shaft in such a way that an escape of the medium from one annular chamber into the neighboring one is prevented. Thus environmental damage that could be caused by the escape of lubrication oil from ships and into the water is prevented.

Another embodiment of the present invention is particularly non-polluting since, in this embodiment, no lubricant at all is used on the external water side of the seal and, accordingly, if leaks should occur, the only substance that can escape into the outside water is nonpolluting water.

In another embodiment of the present invention, it is possible to heat the lubricant supplying the shaft bearing and, thus also, to ensure the lubrication of the shaft bearing even under extreme conditions such as in icy waters.

BRIEF DESCRIPTION OF THE DRAWINGS

The following Detailed Description of the Preferred Embodiments may be better understood when taken in conjunction with the appended drawings in which.

DESCRIPTION OF THE PREFERRED EMBODIMENTS

Figure 1:
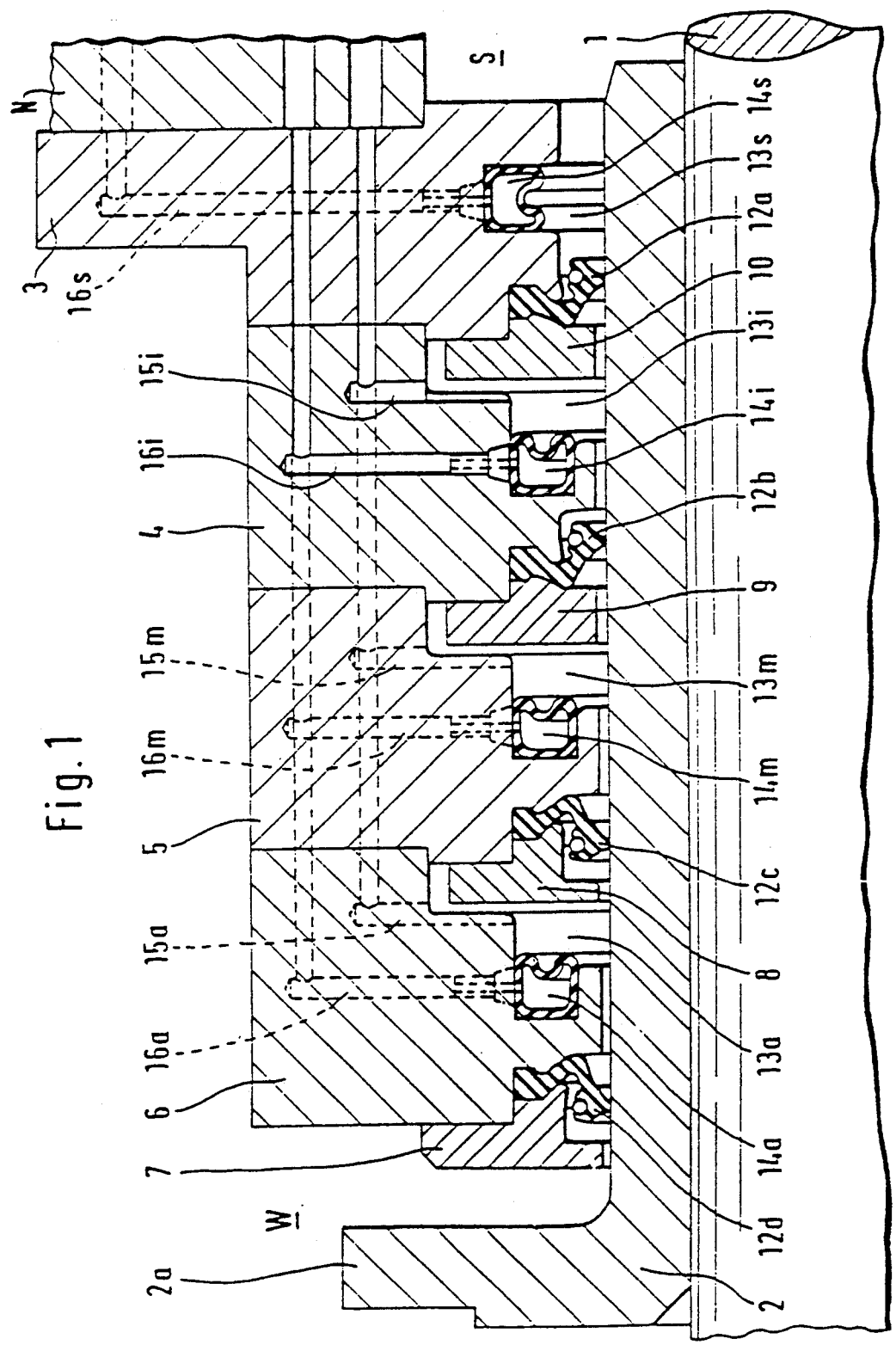
FIG. 1 is a side elevational view, partially in cross section, of a lubricating system and a stern tube sealing apparatus for the propeller shaft of a ship, wherein the inflatable bodies are deflated.
Figure 2:
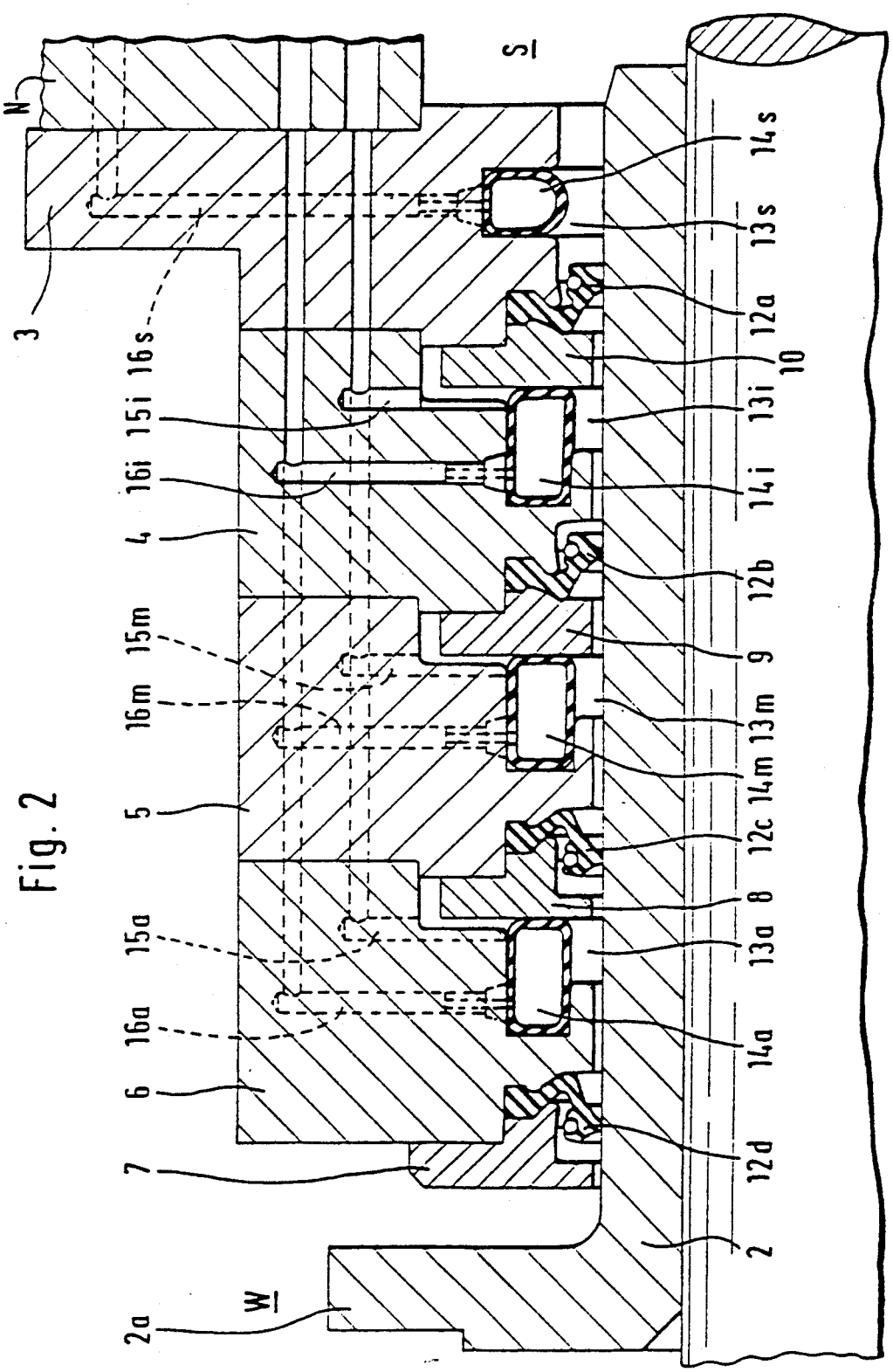
FIG. 2 shows the lubricating system, the sealing apparatus and propeller shaft illustrated in FIG. 1, wherein the inflatable bodies are inflated.

FIGS. 1 and 2 show propeller shaft 1 onto which bushing 2 is drawn. Bushing 2 is connected by flange 2a to a propeller (not shown) so that bushing 2 rotates together with the propeller. One end of bushing 2 projects into external water W and another end of bushing 2 projects into lubricating oil chamber S of the shaft bearing (not shown). In contact with bushing 2 are ring-shaped lip seals 12a, 12b, 12c and 12d, which are located at some distance from one another so that two lip seals, 12c and 12d, correspond to water W to be sealed off and two lip seals, 12a and 12b, correspond to lubrication oil in chamber S which is to be sealed off.

Lip seals 12a, 12b, 12c and 12d are mounted on ring parts 3, 4, 5 and 6, which are located next to one another in the axial direction. Ring part 3, which is adjacent to lubrication oil chamber S, is fastened to stern nut N. Thus, ring part 3 supports the entire sealing apparatus. The fastening of lip seals 12a, 12b, 12c and 12d to ring parts 3, 4, 5 and 6 is done by chucking or fixing, for which purpose there are provided corresponding chuckings, or fixings, 7, 8, 9 and 10.

Between each pair of neighboring ring parts, i.e. between ring parts 3 and 4, ring parts 4 and 5 and ring parts 5 and 6, is positioned one of annular chambers 13a, 13i and 13m. Each of ring lines 15a, 15i and 15m for liquid lubricating oil, is connected to one of annular chambers 13a, 13i and 13m. FIGS. 1 and 2 show only one such connection. The connections that are not shown are, preferably, located in the vicinity of the connection shown in FIGS. 1 and 2.

Each of annular chambers 13a, 13i and 13m are equipped with a lateral annular groove in which inflatable bodies 14a, 14i and 14m are inserted. Each inflatable body 14a, 14i and 14m, which may be hydraulically operated, is connected to one of a separate, closed ring line 16a, 16i and 16m in which heated, compressed air is circulated and into which the various operating means are integrated.

In FIG. 1, inflatable bodies 14a, 14i and 14m are shown in their deflated position, i.e. in the position wherein they are retracted into the lateral annular groove of the annular chambers 13a, 13i and 13m. The feed of heated, compressed air to bodies 14a, 14i and 14m is interrupted, or stopped, when they are in such a retracted position. This operating position, wherein bodies 14a, 14i and 14m are retracted, represents the normal condition wherein propeller shaft 1 is in rotating.

FIG. 2 shows inflatable bodies 14a, 14i and 14m in their inflated position, wherein the feed of heated compressed air is supplied to bodies 14a, 14i and 14m. As shown in FIG. 2, bodies 14a, 14i and 14m are expanded to occupy a significant portion of annular chambers 13a, 13i and 13m and, simultaneously, close the lubricant entrance openings for the lubricating oil to chambers 13a, 13i and 13m.

This operating position corresponds to the state in which propeller shaft 1 is stationary and may be in icy, outside water. In this inflated position, inflated bodies 14a, 14i and 14m, with their increased surface area, may act as heat exchangers for the correspondingly reduced portion of the lubricant oil, and heat the lubricant so that damage to the seal lips is prevented when propeller shaft 1 is restarted.

Figure 3:
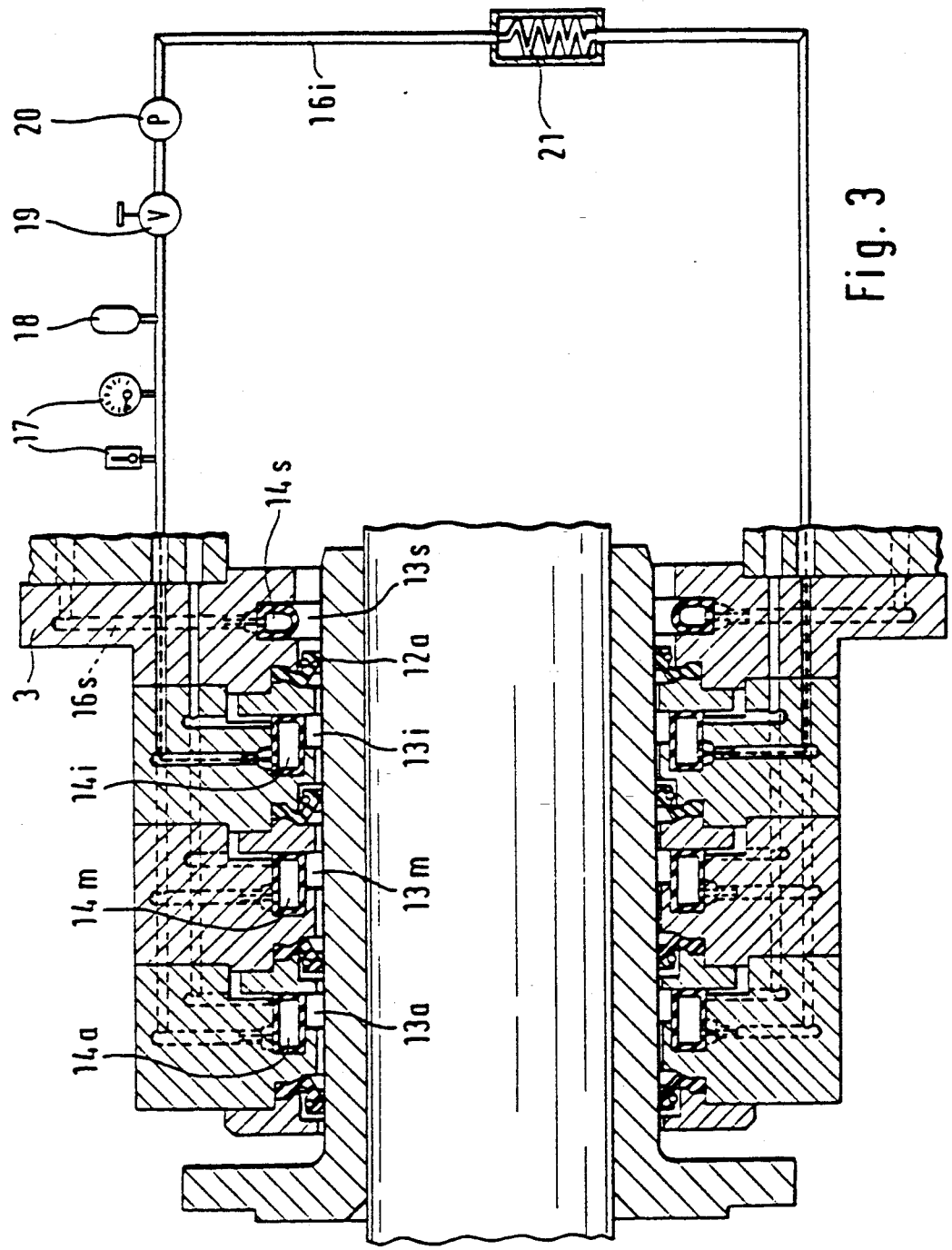
FIG. 3 is a side elevational view, partially in cross section, of the lubrication system and the stern tube sealing apparatus of the present invention, along with a schematically illustrated operating and control system of the present invention.

FIG. 3 shows one of ring lines 16a, 16i and 16m, namely ring line 16i, that is used in conjunction with inflatable body 14i, along with the essential operating means for ring line 16i and body 14i. These operating means, shown connected to one another in series, consist of conventional display mechanisms 17, conventional pressure reservoir 18 with a control unit (not shown), conventional cutoff and throttle mechanism 19, conventional pump 20 and conventional heat exchanger 21. In the embodiment of the invention shown in FIG. 3, heat exchanger 21 carries the flow of a heat transfer medium (not shown).

Figure 4:
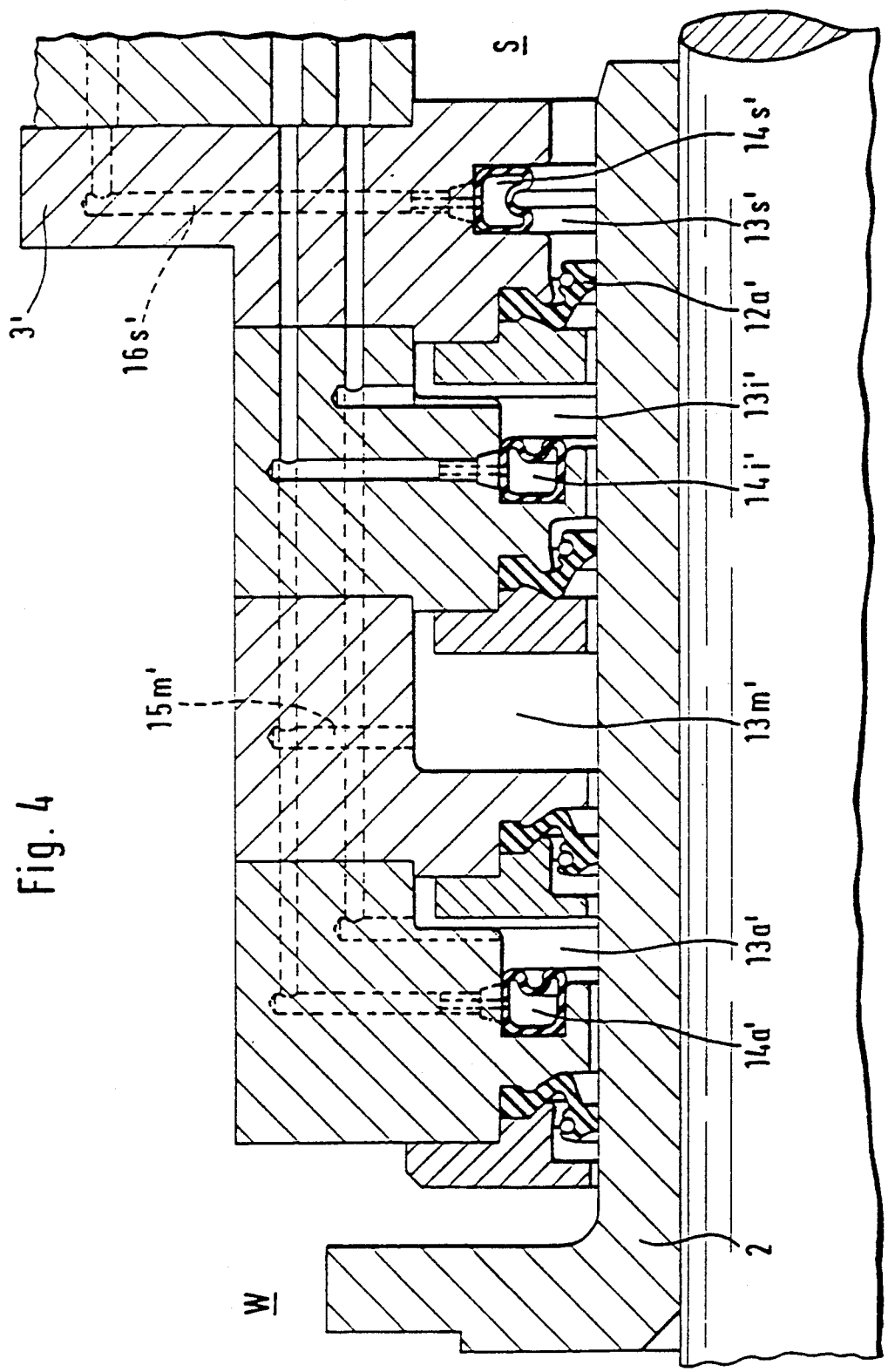
FIG. 4 shows the lubrication system and the sealing apparatus of the propeller shaft illustrated in FIGS. 1, with the exception that a central annular chamber carrying compressed air is provided in the embodiment of the invention shown in FIG. 4.

In the embodiment of the invention illustrated in FIG. 4, only annular chambers 13i' and 13a' are equipped with inflatable bodies 14i' and 14a', respectively, while center annular chamber 13m' is designed without anything built inside. In this embodiment, annular chamber 13a', on the outside or water side, is filled with water and annular chamber 13i', on the shaft bearing side, is filled with lubricating oil.

Center annular chamber 13m' is pressurized with compressed air at a pressure which approximately equals the pressure of the water and lubricating oil in chambers 13i' and 13a'. In addition, a leak, or overflow, line 15m'' (See FIG. 5) is also connected to the ring line 15m' of annular chamber 13m'. Leak line 15m'' is configured to empty into the inside of the ship having propeller 1.

This embodiment of the invention provides ease of operation and absence of pollution since the compressed air in center annular chamber 13m', together with the pressurization of annular chambers 13a' and 13i' with water and lubrication oil, respectively, releases only non-polluting portions of such media into the outside water or allows only the bearing lubrication oil to escape in the event of leaks. Moreover, in the event of an interruption of the pressure in center annular chamber 13m', any leaks penetrating into center annular chamber 13m' are rendered harmless by means of leak line 15m''.

Figure 5:
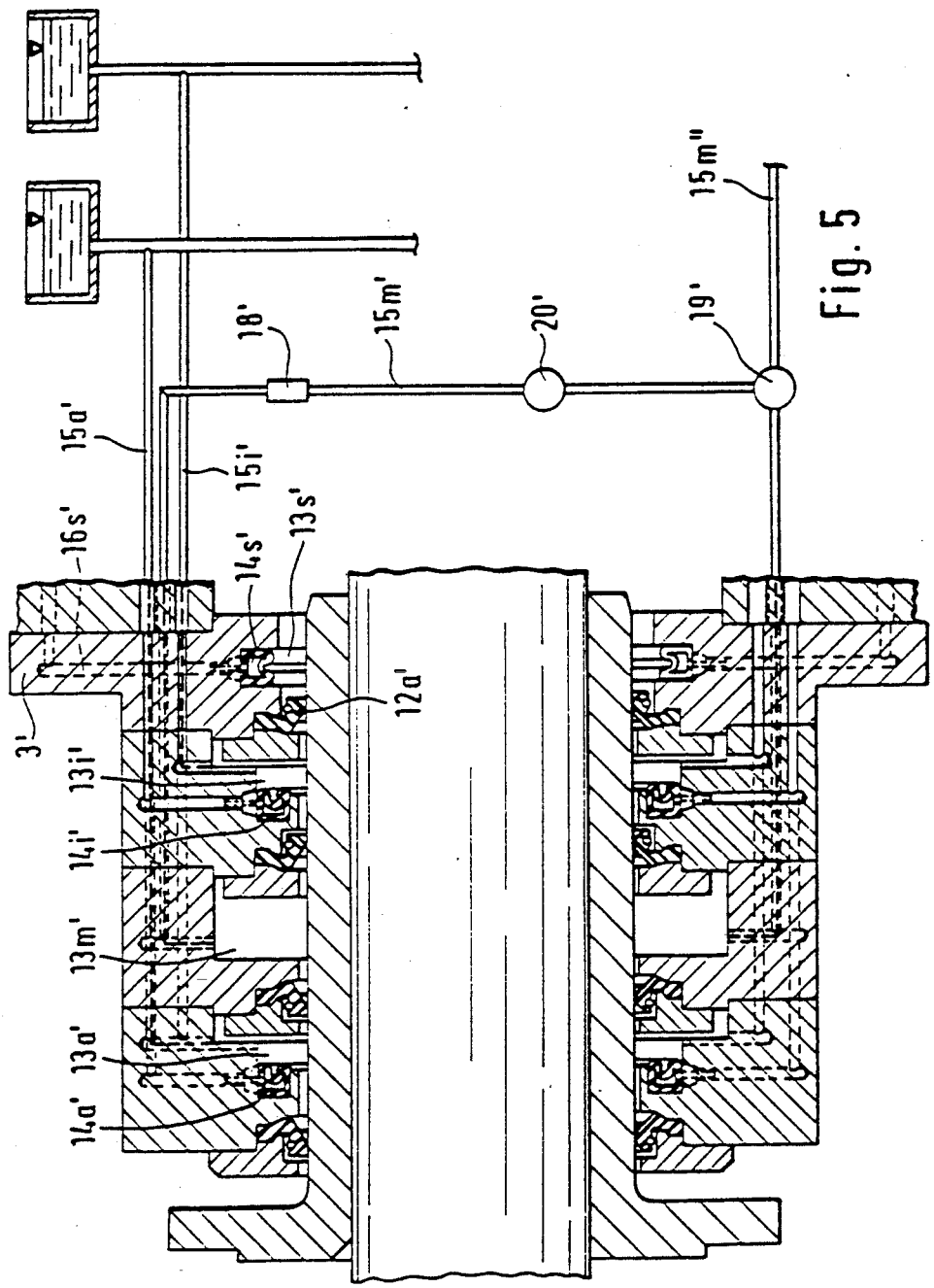
FIG. 5 is a side elevational view, partially in cross section, of the lubrication system and the stern tube sealing apparatus of the present invention, along with a schematically illustrated operating and control system of the present invention.

FIG. 5 shows a different embodiment of the present invention from that illustrated in FIG. 4. The embodiment of the invention shown in FIG. 5 includes ring line 15m' of center annular chamber 13m' along with essential operating equipment incorporated with it such as control unit 18', compressor 20', solenoid valve 19' and leak line 15m''. Ring lines 15a' and 15i', for annular chambers 13a,' and 13i', plus their corresponding reservoirs are also shown in FIG. 5.

In all of the Figures appended hereto, additional annular chambers 13s and 13s', with corresponding inflatable bodies 14s and 14s' along with corresponding ring lines 16s and 16s', are shown as being positioned on the innermost ring portion 3 or 3' and in front of the innermost lip seal 12a or 12a'. Inflatable bodies 14s and 14s' operate in a manner similar to the other inflatable bodies of the present invention and may transfer heat to the lubricant of the shaft bearing when propeller shaft 1 is stationary such as in icy water.

One aspect of the invention resides broadly in sealing apparatus for rotating shafts, in particular stern tube seal for propeller shafts 2 of ships which is in contact on one hand with a liquid external medium, preferably sea water W, and on the other hand with a liquid lubricant, preferably lubricating oil S, for the lubrication of the shaft bearing, and on which are chucked and/or fixed at least two gaskets, preferably lip seals 12a-d, each between two ring parts 3, 4, 5, 6, 7, and in which between each two gaskets, an annular chamber 13i, m, a is reserved, into which a ring line 15*i, m, a* empties for a lubricant, preferably lubricating oil or water, at a specified pressure, characterized by the fact that in at least one of the annular chambers 13*i, m, a* there is a hose-shaped inflatable body 14*i, m, a*, through which via a ring line 16*i, m, a*, a fluid heat transfer medium, preferably air, heated by a heat source and which simultaneously acts as a pressure medium, can be circulated so that when the shaft 2 is at a standstill in an extremely cold liquid medium, preferably icy sea water, the inflatable body 14*i, m, a* is inflated by the heat transfer medium/pressure medium so that it fills up the major portion of the annular chambers 13*i, m, a* and simultaneously heats the lubricant in the remaining portion of the annular chamber 13*i, m, a* so that its viscosity approximately equals the viscosity of the lubricant when the shaft 2 rotates, while during rotation of the shaft 2 the inflatable body 14*i, m, a*—after interruption of the heat transfer medium/pressure medium feed—is deflated so that it frees the annular chamber 13*i, m, a* and the passage through it.

Another aspect of the invention resides broadly in a sealing apparatus characterized by the fact that the inflatable body 14*i, m, a* is embedded in a lateral annular groove of the annular chamber 13*i, m, a*, so that when it is deflated, it is retracted into the annular groove, and when it is inflated it projects into the annular chamber.

Yet another aspect of the invention resides broadly in a sealing apparatus characterized by the fact that installed in the ring line 16*i, m, a* for the heat transfer medium/pressure medium, in series, are display mechanisms 17, a pressure reservoir with control unit 18, a throttle and cutoff mechanism 19, a transport mechanism 20, and a heat exchanger 21 which can be activated and deactivated.

A further aspect of the invention resides broadly in a sealing apparatus characterized by the fact that when the heat exchanger 21 is deactivated, the pressure of the heat transfer medium/pressure medium can be varied by means of the control unit 18, so that the inflatable body 14*i, m, a* is located in the annular chamber 13*i, m, a* in an intermediate position between the inflated position and the deflated position, whereby the control is exercised so that the pressure of the lubricant in the one annular chamber can be adjusted to the current pressure in the neighboring chambers.

A yet further aspect of the invention resides broadly in a sealing apparatus characterized by the fact that if there are three annular chambers 13*i', m', a'*, only the outer two annular chambers 13*i', a'* are equipped with inflatable bodies 14*i', a'*, while the center annular chamber 13*m'* is connected to ring line 15*m'* carrying a gas under pressure, preferably compressed air, which can be routed via a closeable leak line 15*m"* leading to the inside of the ship.

Yet another further aspect of the invention resides broadly in a sealing apparatus, characterized by the fact that the pressure in the ring line 15*m'* equals approximately the current pressure of the media in the neighboring annular chambers 13*i, a'*.

An additional aspect of the invention resides broadly in a sealing apparatus, characterized by the fact that the annular chamber 13*a'* on the side of the external medium is pressurized with water as a lubricant and the annular chamber on the shaft bearing side 13*i'* is pressurized with lubricating oil as the lubricant.

A yet additional aspect of the invention resides broadly in a sealing apparatus characterized by the fact that in front of the gasket 12*a, a'* on the shaft bearing side, there is an additional annular chamber 13, s, s', in which there is an additional inflatable body 14, 14*s'* which can be pressurized by its own heat transfer/pressure medium.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A lubrication system for lubricating gaskets in a propeller shaft bearing for sealing a rotatable propeller shaft of a ship when the propeller shaft is at a standstill in very cold water, said system comprising:

a plurality of annular chambers at least partially surrounding the propeller shaft;

supply means for supplying lubricant;

said supply means being connected to said plurality of chambers for supplying lubricant to said plurality of chambers;

said plurality of annular chambers for supplying lubricant to the shaft means and said gaskets;

a heater for heating a fluid medium;

heat exchanger means in fluid communication with said heater;

said heat exchanger means comprising at least one inflatable body for being inflated and deflated;

each said inflatable body being positioned in said plurality of annular chambers for directly transferring heat to the lubricant disposed in said plurality of annular chambers;

said plurality of annular chambers being configured such that the lubricant directly heats said gaskets;

said inflatable bodies and said heater for heating said fluid medium being configured for heating said lubricant to a temperature such that the lubricant viscosity during shaft stand-still is generally equal to the lubricant viscosity during shaft rotation;

the volume of lubricant in said plurality of chambers is substantially reducible by inflation of said inflatable body;

said fluid medium being for inflating and deflating said inflatable bodies;

means for transporting said fluid medium when heated for inflating said inflatable bodies;

means for transporting said fluid medium for deflating said inflatable bodies; and means for pressurizing said fluid medium in said means for transporting said fluid medium to a pressure such that the pressure is approximately equal to the pressure in at least one of said plurality of annular chamber.

2. The system of claim 1, further including means for controlling said heater to heat the lubricant when the propeller shaft is stationary.

3. The system of claim 1, wherein: said inflatable body is hose shaped;
said plurality of annular chamber comprise at least three annular chambers which at least partially surround the shaft means;
two of at least three annular chambers each include a hose-shaped inflatable body;
one of said at least three annular chambers is connected to a ring line;
said ring line carries fluid under pressure;
said ring line is connected to a closeable leak-line that leads to the inside of the ship;
the pressure in said ring line is approximately equal to the pressure in at least one of said at least three annular chambers;
at least one of said at least three annular chambers is pressurized with water as a lubricant and another of said at least three annular chambers is pressurized with oil as a lubricant;
an additional annular chamber is positioned in front of a gasket; and
an additional inflatable body is at least partially positioned within said additional annular chamber wherein said additional inflatable body can be pressurized by a heat transfer and pressure medium.

4. The system of claim 3, wherein:
said ring line includes: a display mechanism, a pressure reservoir, a control unit, a throttle and cut-off mechanism, a transport mechanism and second heat exchanger means;
said control unit includes means for varying the pressure within said inflatable body such that said inflatable body assumes a position between said retracted position and said extended position; and
said control unit includes means for equalizing the pressure within at least two of said at least three annular chamber.

5. The system of claim 4, wherein:
said lubrication system includes a stern tube seal for sealing the lubricant adjacent the shaft means;
at least two lip seal gaskets are position adjacent the shaft means;
at least one ring part is positioned between said two lip seal gaskets; and
the lubricant is emptied into at least one of said three annular chambers at a specified pressure.

6. A lubrication system for a rotatable propeller shaft means of a ship, said system comprising:
supply means for supplying lubricant;
at least one chamber being connected to said supply means and at least partially surrounding the shaft means;
said supply means for supplying lubricant to said at least one chamber;
said at least one chamber for supplying lubricant to the shaft means;
closer means positioned in said at least one chamber for closing said at least one chamber;
heat exchanger means positioned in said at least one chamber for transferring heat to the lubricant;
means for moving said closer means and said heat exchanger means between:
a retracted position within said at least one chamber wherein the lubricant flows through said supply means and to said at least one chamber and wherein heat transfer from said heat exchanger means to the lubricant is minimized; and
an extended position within said at least one chamber wherein said closer means blocks the flow of lubricant between said supply means and said at least one chamber and wherein heat transfer from said heat exchanger means to the lubricant is maximized; and
said closer means including means for confining lubricant within a portion of said at least one chamber and adjacent the shaft means when said closer means is in said extended position.

7. The system of claim 16, further including:
heater means connected to said heat exchanger means for supplying heat to said heat exchanger means; and
means for controlling said heater means to heat the lubricant when the shaft means is stationary.

8. The system of claim 17, further including:
means for supplying a pressurized and heated fluid to said heat exchanger means wherein said heat exchanger means assumes said extended position and wherein said heat transfer to the lubricant is maximized; and
means for removing fluid from said heat exchanger means wherein said heat exchanger means assumes said retracted position and wherein said heat transfer to the lubricant is minimized.

9. The system of claim 18, wherein:
said heat exchanger means defines an inflatable body;
said inflatable body is embedded in a lateral annular groove of said at least one chamber such that said inflatable body is retracted in the annular groove when said heat exchanger means is in said retracted position;
at least three annular chambers at least partially surround the shaft means;
two of said at least three annular chambers each include a hose-shaped inflatable body;
one of said at least three annular chambers is connected to a ring line;
said ring line carries gas under pressure;
said ring line is connected to a closeable leak line that leads to the inside of the ship;
the pressure in said ring line is approximately equal to the pressure in at least one of said at least three annular chambers;
at least one of said at least three annular chambers is pressurized with water as a lubricant and another of said at least three annular chambers is pressurized with the oil as a lubricant;
an additional annular chamber is positioned in front of a gasket;
as additional inflatable body is at least partially positioned within said additional annular chamber wherein said additional inflatable body can be pressurized by a heat transfer and pressure medium;
said ring line includes: a display mechanism, a pressure reservoir, a control unit, a throttle and cut-off mechanism, a transport mechanism and second heat exchanger means;
said control unit includes means for varying the pressure within said inflatable body such that said inflatable body assumes a position between said retracted position and said extended position;
said control unit includes means for equalizing the pressure within at least two of said at least three annular chambers;
said lubrication system includes a stern tube seal for sealing the lubricant adjacent the shaft means;

at least two lip seal gaskets are positioned adjacent the shaft means;

at least one ring part is positioned between said two lip seal gaskets; and the lubricant is emptied into at least one of said three annular chambers at a specified pressure.

10. The system of claim 1, wherein:

an annular groove is disposed in each of said plurality of annular chambers;

each said inflatable body is disposed in a corresponding said annular groove;

each of said annular grooves surrounds a substantial portion of its corresponding inflatable body; and each said inflatable body is disposed in its corresponding annular groove such that said inflatable body is retractable into its corresponding annular groove when deflated.

11. A method of heating at least one lubricant in a propeller shaft bearing, the at least one lubricant being for lubricating and heating gaskets about a rotatable propeller of a ship before starting the propeller once the propeller shaft has been at a standstill in icy water, said method comprising:

hating a fluid medium with a heater;

providing said heated fluid medium for heating said at least one lubricant in said propeller shaft bearing to a temperature sufficient to heat the gaskets in the propeller shaft bearing, the temperature of said at least one lubricant being, when heated, substantially equivalent to a temperature of said at least one lubricant during rotation of the shaft during operation of the ship;

pumping the fluid medium into a plurality of annular chambers which contain the gaskets which seal the rotatable propeller shaft;

directly heating the lubricant disposed in the annular chambers by transferring heat from the heated fluid medium to the lubricant;

heating the gaskets with the heated lubricant to a temperature substantially equivalent to a temperature of said at least one lubricant during operation of the propeller shaft of the ship; and rotating the propeller shaft after the gaskets have been heated to said temperature generally similar to a temperature of said at least one lubricant during operation of the propeller shaft of the ship.

* * * * *

UNITED STATES PATENT AND TRADEMARK OFFICE
CERTIFICATE OF CORRECTION

PATENT NO. : 5,137,116
DATED : August 11, 1992
INVENTOR(S) : Ernst-Peter VON BERGEN and Gunter PIETSCH It is certified that error appears in the above-indentified patent and that said Letters Patent is hereby corrected as shown below:

In column 6, line 65, Claim 1, after 'annular', delete "chamber" and insert --chambers--.

In column 7, line 3, Claim 3, after 'annular', delete "chamber" and insert --chambers--.

In column 7, line 37, Claim 4, after 'annular', delete "chamber" and insert --chambers--.

In column 8, line 11, Claim 7, after 'claim', delete "16," and insert --6,--.

UNITED STATES PATENT AND TRADEMARK OFFICE
CERTIFICATE OF CORRECTION

PATENT NO. : 5,137,116

DATED : August 11, 1992

INVENTOR(S) : Ernst-Peter VON BERGEN and Gunter PIETSCH

It is certified that error appears in the above-indentified patent and that said Letters Patent is hereby corrected as shown below:

In column 8, line 17, Claim 8, after 'claim', delete "17," and insert --7,--.

In column 8, line 27, Claim 9, after 'claim', delete "18," and insert --8,--.

In column 10, line 1, Claim 11, before 'a' first occurrence, delete "hating" and insert --heating--.

Signed and Sealed this

Twenty-third Day of July, 1996

Attest:

BRUCE LEHMAN

Attesting Officer

Commissioner of Patents and Trademarks